United States Patent [19]

Khoe

[11] Patent Number: 4,784,460
[45] Date of Patent: Nov. 15, 1988

[54] LIGHT-CONDUCTING FIBRES CONNECTING DEVICE WITH REDUCED TEMPERATURE EFFECTS

[75] Inventor: Giok D. Khoe, Eindhoven, Netherlands

[73] Assignee: U.S. Philips Corp., New York, N.Y.

[21] Appl. No.: 937,595

[22] Filed: Dec. 3, 1986

[30] Foreign Application Priority Data

Dec. 11, 1985 [NL] Netherlands ............... 8503409

[51] Int. Cl.$^4$ .............................................. G02B 6/38
[52] U.S. Cl. .................................................. 350/96.21
[58] Field of Search ............... 350/96.21, 96.22, 96.23, 350/96.2

[56] References Cited

U.S. PATENT DOCUMENTS 4,475,790  10/1984  Little .................................. 350/96.22
4,629,284  12/1986  MaLavieille ...................... 350/96.21

FOREIGN PATENT DOCUMENTS

3408783A1  2/1985  Fed. Rep. of Germany .
3443693    6/1986  Fed. Rep. of Germany ... 350/96.21
0156908   12/1980  Japan ............................... 350/96.21

Primary Examiner—Stanley D. Miller
Assistant Examiner—Timothy P. Callahan
Attorney, Agent, or Firm—William L. Botjer

[57] ABSTRACT

The device comprises at least a carrier (1) with a flat surface, in which centering grooves (5) are provided for the play-free take-up of an end section (13) of a light-conducting fibre (3) from which its protective cover (11) has been removed. The length of the centering groove (5) is at most equal to five times the diameter of the light-conducting fiber (3) without protective cover (11) and in the line with the centering groove a supporting groove (7) linking up with the centering groove is provided, the width of which is between 5 and 10 μm greater than that of the centering groove. The supporting groove (7) serves to take up with play a second section (15) of the fibre (3) linking up with the end section (13) and from which the protective cover has likewise been removed. Thanks to the short length of the centering groove (5) temperature changes have no significant effect on the position of the end section (13) in spite of the different coefficients of expansion of the carrier (1) and the fibre (3).

4 Claims, 1 Drawing Sheet

LIGHT-CONDUCTING FIBRES CONNECTING DEVICE WITH REDUCED TEMPERATURE EFFECTS

The invention relates to an device for interconnecting light-conducting fibres, comprising at least a carrier with a flat surface, in which at least a centering groove is provided for the play-free take-up of an end section of a light-conducting fibre from which its protective cover has been removed.

A device of this type is known from DE-A No. 3 408 783. The carrier is, for example, a silicon wafer, in which the centering grooves are formed by etching. To obtain a good optical coupling between the light-conducting fibres to be connected together it is necessary for the end sections of the fibres to fit precisely into the centering grooves. This means that over their entire length the end sections are in contact with the walls of the centering grooves. The materials of which the fibres and the carrier are made (for example, quartz and silicon, respectively), however, have different coefficients of expansion so that temperature changes may give rise to changes in the position of the end sections. As a result, the coupling efficiency may be reduced. It is an object of the injection to provide a device of the kind mentioned in the preamble, in which the influence of the difference between the coefficients of expansion of the carrier and the light-conducting fibres on the coupling efficiency is reduced to a minimum. For this purpose, the device according to the invention is characterised in that the length of the centering groove is at most equal to five times the diameter of the light-conducting fibre without the protective cover. In line with the centering groove is a supporting groove linking up with the centering, the width of which is at least 5 μm and at most 10 μm greater than that of the centering groove for taking up with play a second section of the fibre linking up with the end section and from which the protective cover has likewise been removed.

The invention is based on the insight that in order to obtain a good coupling between two light-conducting fibres only the position of a relatively short end section of each of these fibres is of essential importance. The second section of the fibre linking up with this end section must admittedly be supported in order to prevent it from moving and thereby exerting forces on the end section, but extremely accurate positioning of this second section is not necessary. In the arrangement according to the invention only the very short end section of the light-conducting fibre comes into close contact with the carrier. Thanks to the short length of this end section temperature changes can only lead to negligibly small changes in its position. The second section lies in the supporting groove with play and its position cannot be influenced in any way at all by temperature changes because the wall of the supporting groove can always move freely with respect to this section.

In order to ensure that the second section and the end section of the light-conducting fibre remain lying in the grooves, a device according to the invention with a carrier which contains in at least one centering groove an end section of a light-conducting fibre, the end face of which is located at the end of the centering groove facing away from the supporting groove, is preferably characterized in that the second section of the fibre is fixed in the supporting groove by means of a permanently flexible adhesive. Since the adhesive remains flexible, the wall of the supporting groove can move freely with respect to the second section of the light-conducting fibre even in the event of temperature changes.

The invention will now be explained in further detail on the basis of the drawings.

DESCRIPTION OF THE PREFERRED EMBODIMENT

Figure 1:
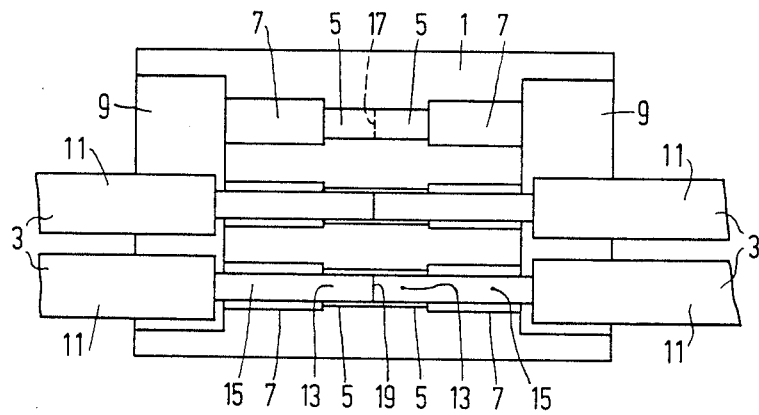
FIG. 1 is a schematic top view of a part of a first embodiment of a device according to the invention.

FIG. 1 shows a top view of a carrier 1 which, preferably, consists of an etchable material such as silicon. The carrier 1 is part of a device for the non-detachable interconnection of light-conducting fibres 3. The carrier 1 has a flat surface (coinciding with the plane of drawing) in which six centering grooves 5 are provided. In line with each centering groove 5 there is a supporting groove 7 linking up with the centering groove, the width of which is slightly greater than that of the centering groove. The difference in width between the supporting groove 7 and the centering groove 5 is between 5 and 10 μm. The grooves 5 and 7 all run in the same direction and their situation is such that the end of each centering groove 5 facing away from the supporting groove 7 links up with a second centering groove 5 lying in the continuation of this, which groove at its other end continues into a second supporting groove 7. For preference, the grooves 5 and 7 are formed by etching. It is, however, also possible to make the grooves 5 and 7 by mechanical machining in the material of the carrier 1. In that case this material need not be etchable. In the carrier 1 there are also two chambers 9 which can be formed in the same way as the grooves 5 and 7. The chamber 9 link up with the free ends of the supporting grooves 7.

The carrier 1 shown in FIG. 1 is suitable for connecting six light-conducting fibres 3 to each other two by two. Each of these light-conducting fibres, of which four are shown in FIG. 1, is surrounded by a protective cover 11, for example of plastic. The protective cover 11 is removed over a certain length so that an end section 13 and a second section 15 of the light-conducting fibre 13 linking up with it are freed. The light-conducting fibre 3 itself consists of a core of light-conducting material with a relatively high refractive index which is surrounded by a cladding of light-conducting material with a relatively low refractive index. The core and the cladding consist, for example, of glass or quartz. The light-conducting fibres 3 have a circular cross-section and the grooves 5 and 7 are, for preference, V-shaped. The width of the centering grooves 5 is chosen in such a way that they can take up the end sections 13 free from play. This means that each end section 13 is in permanent contact with the wall of the centering groove 5 at two places over its entire length. The length of each centering groove 5 is at most equal to five times the diameter of the light-conducting fibre 3 without the protective cover 11, and preferably, approximately twice that diameter. At a fibre diameter of 125 μm the length of each centering groove 5 can be, for example, 250 μm.

The width of the supporting groove 7 is, for example, 5 μm greater than that of the centering groove so that the second section 15 of the light-conducting fibre 3, which naturally has the same diameter as the end section 13, lies in the supporting groove with play. The supporting groove 7 is, preferably, filled with a permanently flexible adhesive, for example an epoxy resin, in which the second section 15 is embedded. The length of the supporting groove 5 is considerably greater than that of the centering groove, for example, five times as great (FIG. 1 is not drawn to scale). Since the second section 15 is fixed in the supporting groove 7, the light-conducting fibre 3, and hence also the end section 13, are permanently connected to the carrier 1. Thanks to the play between the second section 15 and the supporting groove 7, and thanks to the flexibility of the adhesive in the supporting groove, in the event of a change in temperature no forces of any significance are exerted by the wall of the supporting groove on the second section in spite of differences in coefficients of expansion. The end sections 13 can be fixed in the centering grooves 5 with a rigid adhesive. The end of the protective cover 11 lies in the chamber 9, where it can be secured by gluing or with a compression joint (not shown).

One of the transitions between two centering grooves 5 lying a line with each other is shown with a dashed line 17 in FIG. 1. When end sections 13 of light-conducting fibre 3 are fixed in two centering grooves 5 in line with each other in such a way that the end face 19 of each end section is located at the end of the centering groove which is facing away from the supporting groove, the two end faces lie precisely against each other so that the two fibres are optically coupled to each other at the point of transition 17. Thanks to the glued joint the fibres 3 are permanently connected to the carrier 1 so that the connection between the pairs of fibres can no longer be detached.

Figure 2:
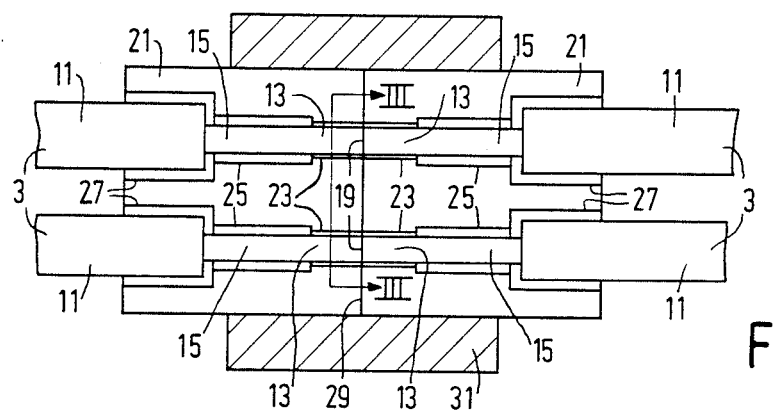
FIG. 2 is a schematic top view of a part of a second embodiment of a device according to the invention.

An embodiment of a device for the detachable connection of pairs of light-conducting fibres is represented schematically in FIG. 2. This device comprises two carriers 21, each with a flat surface, which lies in the plane of the drawing and in which centering grooves 23 are provided which continue on one side into supporting grooves 25 which lie in the continuation of the centering grooves and are followed by chambers 27. In the same way as described on the basis of FIG. 1, a light-conducting fibre 3 can be fixed into each groove 25 and the end of the protective covering 11 lying in chamber 27. Grooves 23 and 25, respectively, can be similar to the grooves 5 and 7, respectively. In the embodiment according to FIG. 2 a separate chamber 27 is present for each fibre 3, while in the embodiment according to FIG. 1 a common chamber 9 is present for all the fibres lying side by side with each other. The grooves 23 and 25, and the chambers 27 can be made in the carrier 21 in the same way as the grooves 5 and 7 and the chambers 9 in the carrier 1. The fibres 3 can also be fixed into the carriers 1 and 21 in the same way. The centering grooves 23 open into a free end face 29 of the carrier 21. The fibres 3 are placed in the grooves in such a way that end faces 19 lie at the point where the free ends of the centering grooves 23 are located, so that they lie in the free end face 29 of the carrier.

Figure 3:
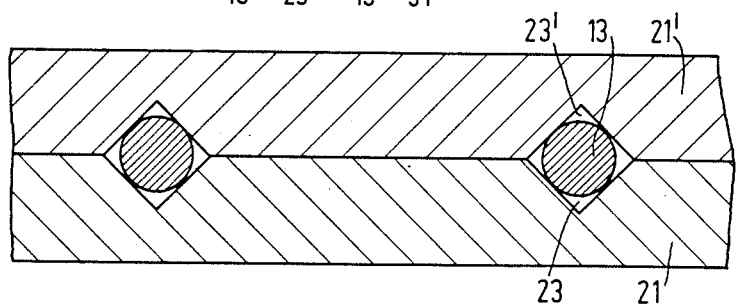
FIG. 3 is a cross-section according to the line III—III of the device shown in FIG. 2.

As shown in FIG. 3 each carrier 21 is covered by a second carrier 21' which has been removed in FIG. 2 in order to show the position of the fibres 3 in the grooves 23 and 25. The second carrier 21', like the first carrier 21, comprises a flat surface in which grooves are provided, the position and dimensions of which correspond to those of the grooves in the surface of the first carrier. The second carrier 21' is placed on the correspondingly grooved first carrier 21, the grooved surfaces of the two carriers lying against each other, the arrangement being such that each centering groove 23 in the first carrier together with the corresponding centering groove 23' in the second carrier forms a tubular cavity, the cross-section of which is a polygon with an inscribed circle, the diameter of which is equal to the diameter of the light-conducting fibre 3 without the cover 11.

In the example shown in FIGS. 2 and 3 the centering grooves 23 and 23' are V-shaped with a top angle of 90° so that the cross-section of the above-mentioned cavity is a square into which the end section 13 fits without play. Other shapes of groove lead to different cross-sections of the cavity.

The carriers 21 and 21' placed against each other in the manner described and fixed to each other, for example, with a suitable adhesive, constitute a coupling element. Two such coupling elements can be placed with the free end faces 29 against each other in a connector housing 31 which centers the two coupling elements with respect to each other in such a way that the end sections 13 of the fibres 11 come to lie two by two in line with each other and are optically coupled with each other. The connector housing 31, which is known in itself, is only indicated schematically in FIG. 2. The coupling elements are fitted detachably into this connector housing so that the connection between the light conductors can be interrupted and restored at will.

Figure 4:
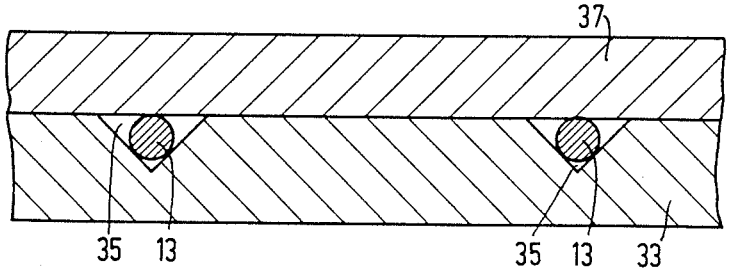
FIG. 4 is a cross-section corresponding to FIG. 3 of a variant of the arrangement shown in FIG. 2.

FIG. 4. shows a cross-section which corresponds to FIG. 3 of a variant of the embodiment according to FIGS. 2 and 3. This variant comprises carriers 33 with a flat surface in which centering grooves 35 and supporting grooves (not shown) are made in a manner corresponding to that in the embodiments described above. The shape and the dimensions of the cross-section of each of the centering grooves 35 are such that the end section 13 of a light-conducting fibre situated in it lies entirely in the centering groove, so that this end section does not project above the edges of the centering groove. A covering plate 37 is attached (for example with a suitable adhesive) to the grooved surface of the carrier 33 in order to form a coupling element. The covering plate 37 covers the end sections 13 and the two sections 15 of the light-conducting fibres 3, so that the end sections lie fittingly in tubular cavities with a triangular cross-section as shown in the example in FIG. 4. If a rigid adhesive is used to attach the covering plate 37 to the carrier 33, care must of course be taken to ensure that this adhesive does not penetrate into the supporting grooves.

In the embodiment according to FIG. 1, too, the carrier 1 can be covered if required with a correspondingly grooved carrier as shown in FIG. 3 or with a flat covering plate as shown in FIG. 4.

In the embodiments shown there is room for two or three light-conducting fibres 3 in each carrier. It will be clear that carriers can likewise be produced for larger or smaller number of fibres.

What is claimed is:

1. A device for interconnecting light conducting fibres comprising:
   a carrier for supporting at least first and second light conducting fibres in an abutting light coupling relationship, said carrier having first and second aligned centering grooves supporting an end portion of each light conducting fibre in abutment without play, each centering groove having a length which is at most five times the diameter of said end portion, whereby temperature changes do not have an appreciable effect on the alignment of said optical fibres in said grooves;
   first and second supporting grooves aligned with opposite ends of each centering groove, having a width 5 $\mu$m–10 $\mu$m greater than said centering grooves, supporting a portion of said light conducting fibre adjacent said end portion, said first and second supporting grooves being wide enough not to influence the position of said light conducting fibres in response to temperature changes; and
   a cover for maintaining said light conducting fibres in said grooves.

2. A device as claimed in claim 1 wherein an adhesive is used to bond said light conducting fibres in said supporting grooves.

3. The device as claimed in claim 1 wherein said centering grooves comprise first and second walls forming a substantially V cross-section.

4. The device of claim 1 wherein said cover is a second carrier having identical centering grooves which form with first carrier centering grooves a polygonal groove cross-section.

* * * * *